(No Model.)
A. C. FOWLER.
COMBINATION RULE, SQUARE, AND CIRCLE MARKER.
No. 463,212. Patented Nov. 17, 1891.
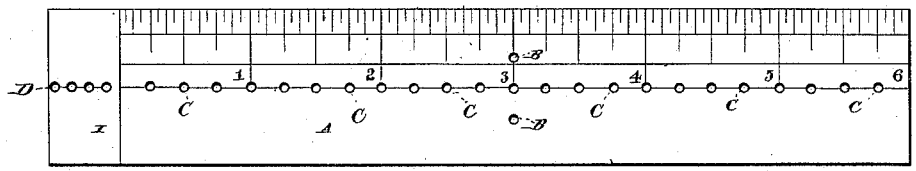
Fig. 1.
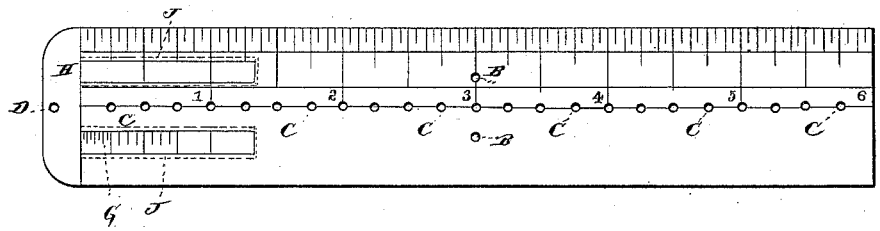
Fig. 4.
Fig. 2.
Fig. 3.
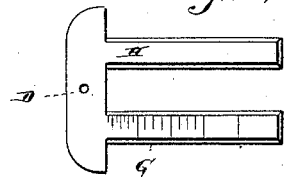
Witnesses:
Albin M. Long.
Alex Scott
Inventor:
Anthony C. Fowler

UNITED STATES PATENT OFFICE.

ANTHONY C. FOWLER, OF NEW UTRECHT, NEW YORK.

COMBINATION RULE, SQUARE, AND CIRCLE-MARKER.

SPECIFICATION forming part of Letters Patent No. 463,212, dated November 17, 1891.

Application filed February 28, 1891. Serial No. 383,309. (No model.)

*To all whom it may concern:*

Be it known that I, ANTHONY C. FOWLER, a citizen of the United States of America, and a resident in the town of New Utrecht, in the county of Kings and the State of New York, have invented a new and useful Combination Rule, Square, and Compass, of which the following is a full, clear, concise, and exact description, reference being had to the accompanying drawings, in which similar letters refer to similar parts throughout the several views.

My invention relates to a measure of lengths so graduated and perforated at convenient distances as to admit of its use to describe arcs of a circle, and also provided with such perforations at right angles to its sides as to permit of describing right angles or squares.

The objects of my invention are to provide a measuring-rule by means of which circles or parts of circles of any given radius may be laid off without the use of a pair of compasses, and by means of which right angles may also be laid off without the use of a square; or, in other words, a rule capable of being used equally as a pair of compasses or a square, as may be desired.

Another object is to provide a terminal graduated movable pivotal guide attached to the rule and capable of adjustment of fractional parts thereof for laying off circles or arcs thereof.

In the accompanying drawings, Figure 1 is a plan view of my rule; Fig. 2, the terminal pivotal adjustable slide withdrawn, and Fig. 3 the pivotal stud with a retaining-collar; Fig. 4, my rule with adjustable slide in ways.

A is the body of the rule; B B, right-angle perforations; C C, radial perforations; D D' D$^2$ D$^3$, pivotal perforations; E, pivotal stud; F, collar; G, graduations; H, terminal adjustable slide; I, pivotal bar; J, guideway for adjustable slide.

To construct my rule a strip A, having straight parallel sides of wood, metal, or other suitable material, is graduated or marked, as is shown in Fig. 1, to indicate ordinary measures of length G, according to the metric or any other like system, in a manner similar to ordinary carpenters' rules, and also at convenient regular intervals corresponding to any such graduations or marks the strip is perforated, as at C, so as to admit the insertion within any such perforation of the point of a pencil or any other suitable marker whenever the rule is used for the purpose of laying off circles or arcs without recourse to a pair of compasses. At any convenient point intermediate to the ends two or more like perforations B B are made in a line at right angles to the edges of the rule, and so as to admit of indicating thereat two or more points in such line for the purpose of laying off a line at right angles to a line drawn upon the edge of the rule without recourse to a square-rule. At either end of the rule a fixed projecting strip or bar I is provided with pivotal perforations D D' D$^2$ D$^3$, as shown in Fig. 1, for the purpose of admitting the insertion of a pivotal stud E or other means for holding such end of the rule while an arc or circle is being described by means of a pencil inserted at any of the radial perforations C C. This bar is also graduated so as to admit of a radial elongation in smaller fractions of measure than those designated on the rule A. In lieu of such fixed pivotal bar, I preferably employ a bar or strip provided with a single pivotal perforation adapted to slide in ways J, Fig. 4, in the body of the rule and graduated upon its upper surface to fractional parts of any unit of measure which is adopted for the rule, so as to enable a desired radius to be obtained with facility by the partial withdrawal of the sliding bar till the distance between the pivotal perforation from the desired radial perforation is obtained to the intended fraction of a unit of measurement. A pointed pivotal metallic stud, which is of sufficient length to extend a short distance beyond the under surface of the rule when such stud is inserted in any desired pivotal perforation for use, serves as a pivot in describing circular lines, and is further provided with a collar of thin metal to retain it in position in the perforation, if desired, and to prevent its accidental withdrawal.

To operate my rule in describing a circle or an arc, the pivotal stud is pressed upon a drawing-board or any object upon which the drawing is to be made and a pencil inserted at a radial perforation equal or nearly equal in distance to the desired radius of the circle or arc to be described. It may be exactly obtained by lengthening or shortening such radial distance by means of the graduated slide H, when such slide is used, or by changing the pivotal stud to a pivotal perforation at greater or lesser distance in the pivotal bar I when the rule is made without the slide, as may be desired.

To form a square upon a line parallel with the edge of the rule, the rule is laid upon such line or parallel thereto and the right-angle perforations B B brought in line with the point at which a perpendicular is to be erected. A pencil inserted in such right-angle perforation enables points to be marked in the line of such perpendicular, and by means of the rule (changed in position upon such proposed perpendicular) a line is drawn through such marked points.

What I claim as new, and desire to secure by Letters Patent, is—

1. A rule-measure of length provided with a graduated series of perforations and with a terminal bar provided with graduated perforations adapted to serve with a stud for describing circles, substantially as described.

2. A rule-measure of length provided with a graduated series of perforations and a terminal adjustable slide adapted to serve with a stud for describing circles, substantially as described.

ANTHONY C. FOWLER.

Witnesses:
MARY VOGT,
FANNIE HEGEMAN.